US008843924B2

(12) United States Patent
Dow et al.

(10) Patent No.: US 8,843,924 B2
(45) Date of Patent: Sep. 23, 2014

(54) IDENTIFICATION OF OVER-CONSTRAINED VIRTUAL MACHINES

(75) Inventors: Eli M. Dow, Poughkeepsie, NY (US); Dilma Da Silva, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 13/163,046

(22) Filed: Jun. 17, 2011

(65) Prior Publication Data

US 2012/0324445 A1 Dec. 20, 2012

(51) Int. Cl.
*G06F 9/455* (2006.01)

(52) U.S. Cl.
USPC ............................................................ 718/1

(58) Field of Classification Search
CPC ........ G06F 9/455; G06F 9/5077; G06F 9/445
USPC ................................................. 718/1; 703/22
See application file for complete search history.

(56) References Cited

U.S. PATENT DOCUMENTS

| | | | |
|---|---|---|---|
| 6,026,462 A | 2/2000 | George et al. | |
| 6,038,677 A | 3/2000 | Lawlor et al. | |
| 6,735,666 B1 | 5/2004 | Koning | |
| 7,089,377 B1 | 8/2006 | Chen | |
| 7,159,210 B2 | 1/2007 | Griffin et al. | |
| 7,257,811 B2 | 8/2007 | Hunt et al. | |
| 7,340,777 B1 | 3/2008 | Szor | |
| 7,577,686 B1 | 8/2009 | Larkin et al. | |
| 7,814,287 B2 | 10/2010 | Pratt | |
| 2003/0126103 A1* | 7/2003 | Chen et al. | 706/50 |
| 2004/0128670 A1 | 7/2004 | Robinson et al. | |
| 2005/0086523 A1 | 4/2005 | Zimmer et al. | |
| 2005/0160151 A1 | 7/2005 | Rawson, III | |
| 2005/0256971 A1 | 11/2005 | Colrain et al. | |
| 2006/0005189 A1 | 1/2006 | Vega et al. | |
| 2006/0070065 A1 | 3/2006 | Zimmer et al. | |
| 2006/0294519 A1 | 12/2006 | Hattori et al. | |
| 2007/0006218 A1 | 1/2007 | Vinberg et al. | |
| 2007/0050764 A1 | 3/2007 | Traut | |
| 2007/0061441 A1 | 3/2007 | Landis et al. | |
| 2007/0061492 A1 | 3/2007 | van Riel | |

(Continued)

OTHER PUBLICATIONS

U.S. Appl. No. 12/116,994, filed dated May 8, 2008, "Notice of Allowance" mail dated Aug. 9, 2012.

K. Asrigo, et al., "Using VMM-Based Sensors to Monitor Honeypots," VEE'06 Jun. 14-16, 2006, Ottawa, Ontario, Canada; pp. 13-23.

(Continued)

*Primary Examiner* — Emerson Puente
*Assistant Examiner* — Steven Do
(74) *Attorney, Agent, or Firm* — Cantor Colburn LLP; Steven Chiu (57) ABSTRACT

A method for virtual machine management that includes establishing a first virtual machine on a hardware platform, performing a selected task on the first virtual machine and recording a first data set indicating a characteristic of the first virtual machine performing the selected task. The method also includes establishing a second virtual machine on the hardware platform, performing the selected task on the first and second virtual machines, recording a second data set indicating the characteristic of the first and second virtual machines performing the selected task and indicating acceptable data and unacceptable data within the first and second data sets. The method also includes creating and training a decision tree based on the acceptable and unacceptable data from the first and second data sets and inputting a third data set from a third virtual machine into the decision tree to determine if the third virtual machine is over-constrained.

25 Claims, 7 Drawing Sheets

(56) References Cited

U.S. PATENT DOCUMENTS

| | | | |
|---|---|---|---|
| 2007/0079307 A1 | 4/2007 | Dhawan et al. | |
| 2007/0130366 A1 | 6/2007 | O'Connell et al. | |
| 2007/0244972 A1 | 10/2007 | Fan | |
| 2007/0266383 A1 | 11/2007 | White | |
| 2007/0271559 A1 | 11/2007 | Easton et al. | |
| 2008/0005297 A1 | 1/2008 | Kjos et al. | |
| 2008/0028124 A1 | 1/2008 | Tago | |
| 2008/0235793 A1 | 9/2008 | Schunter et al. | |
| 2008/0263658 A1 | 10/2008 | Michael et al. | |
| 2009/0063749 A1 | 3/2009 | Dow | |
| 2009/0204964 A1 | 8/2009 | Foley et al. | |
| 2009/0241109 A1 | 9/2009 | Vandegrift et al. | |
| 2009/0300605 A1 | 12/2009 | Edwards et al. | |
| 2010/0017800 A1 | 1/2010 | Dow et al. | |
| 2010/0082321 A1* | 4/2010 | Cherkasova et al. | 703/22 |
| 2010/0115133 A1 | 5/2010 | Joshi | |
| 2010/0217793 A1 | 8/2010 | Preiss | |
| 2010/0332658 A1 | 12/2010 | Elyashev | |
| 2011/0072138 A1* | 3/2011 | Canturk et al. | 709/226 |
| 2011/0131388 A1 | 6/2011 | Chen et al. | |
| 2012/0167094 A1* | 6/2012 | Suit | 718/100 |
| 2012/0239376 A1* | 9/2012 | Kraft et al. | 703/22 |

OTHER PUBLICATIONS

U.S. Appl. No. 12/110,593 Filed Dated Apr. 28, 2008; Non-Final Office Action mail date Feb. 16, 2012; 17pages.

U.S. Appl. No. 12/116,994 Filed Dated May 8, 2008; Non-Final Office Action mail date Jan. 20, 2012; 110pages.

"Cloud Computing: Benefits and Risks of Moving Federal IT into the Cloud", Testimony of Cita M. Furlani, Director, Information Technology Laboratory, National Institute of Standards and Technology, United States Department of Commerce, United States House of Representatives Committee on Oversight and Government Reform, Jul. 1, 2010.

IBM Redbooks; "IBM Information Infrastructure Solutions Handbook"; IP.COM; Jun. 2010.

L. Van Doom, "Hardware Virtualization"; ETISS Lecture; Oct. 2007; pp. 1-55.

U.S. Appl. No. 12/116,994, Filing date May 8, 2008; Final Office Action mail date Jun. 19, 2012; 31 pages.

U.S. Appl. No. 13/163,061 Filed dated Jun. 17, 2011; Non-Final Office Action mail date Mar. 12, 2013.

U.S. Appl. No. 13/163,097 Filed Dated Jun. 17, 2011; Non-Final Office Action mail date Mar. 11, 2013; 12 pages.

\* cited by examiner

IDENTIFICATION OF OVER-CONSTRAINED VIRTUAL MACHINES

BACKGROUND

The present invention relates to management of virtual machines on a hardware platform, and more specifically, to an application or method for identifying over-constrained virtual machines on a hardware platform.

Providers of cloud computing, such as Platform as a Service (PaaS) and Infrastructure as a Service (IaaS), have the competing interests of providing desired performance for consumers or end users while also efficiently using the resources used to provide services to consumers. Accordingly, a hardware platform may host a plurality of virtual machines, wherein each virtual machine corresponds to a consumer. Efficient use of the hardware platform resource dictates that the provider place as many virtual machines on the platform as possible without compromising the consumer's use of the virtual machine and experience. In some service areas, providers have limited or no knowledge of the processes running on the consumer's virtual machine. Lack of knowledge about processes on each virtual machine may make it difficult for a provider to place the appropriate amount of virtual machines on a hardware platform without adversely affecting performance of a consumer virtual machine.

SUMMARY

According to one embodiment of the present invention, a method for virtual machine management is provided. The method includes establishing a first virtual machine on a hardware platform, performing a selected task on the first virtual machine and recording a first data set indicating a characteristic of the first virtual machine performing the selected task. The method also includes establishing a second virtual machine on the hardware platform, performing the selected task on the first and second virtual machines, recording a second data set indicating the characteristic of the first and second virtual machines performing the selected task and indicating acceptable data and unacceptable data within the first and second data sets. The method also includes creating and training a decision tree based on the acceptable and unacceptable data from the first and second data sets and inputting a third data set from a third virtual machine into the decision tree to determine if the third virtual machine is over-constrained.

According to another embodiment of the present invention, a system for virtual machine management is provided. The system includes a computer processor and logic executable by the computer processor. The logic is configured to implement a method. The method includes establishing a first virtual machine on a hardware platform, performing a selected task on the first virtual machine and recording a first data set indicating a characteristic of the first virtual machine performing the selected task. The method also includes establishing a second virtual machine on the hardware platform, performing the selected task on the first and second virtual machines, recording a second data set indicating the characteristic of the first and second virtual machines performing the selected task and indicating acceptable data and unacceptable data within the first and second data sets. The method also includes creating and training a decision tree based on the acceptable and unacceptable data from the first and second data sets and inputting a third data set from a third virtual machine into the decision tree to determine if the third virtual machine is over-constrained.

According to a further embodiment of the present invention, a computer program product for virtual machine management is provided. The computer program product includes a storage medium having computer-readable program code embodied thereon, which when executed by a computer processor, causes the computer processor to implement a method. The method includes establishing a first virtual machine on a hardware platform, performing a selected task on the first virtual machine and recording a first data set indicating a characteristic of the first virtual machine performing the selected task. The method also includes establishing a second virtual machine on the hardware platform, performing the selected task on the first and second virtual machines, recording a second data set indicating the characteristic of the first and second virtual machines performing the selected task and indicating acceptable data and unacceptable data within the first and second data sets. The method also includes creating and training a decision tree based on the acceptable and unacceptable data from the first and second data sets and inputting a third data set from a third virtual machine into the decision tree to determine if the third virtual machine is over-constrained.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments relate to systems and applications for monitoring virtual machines, which provide the ability to determine or identify over-constrained virtual machines operating in a network environment. In addition, exemplary embodiments relate to systems and applications for load balancing of virtual machines in a network, such as a cloud computing network. The load balancing of virtual machines provides improved resource utilization while also delivering the proper amount of resources for each end user or consumer. In one exemplary embodiment, the network environment operates via a cloud infrastructure in which the access to processing power, memory (e.g., random access memory and data storage) and associated computing devices is managed by a service provider on behalf of the consumer or end user.

Applications may be used to identify virtual machines that are over-constrained to enable the service provider to move or migrate the over-constrained virtual machine(s) from a first hardware platform to another hardware platform (also referred to as "target platform" or "target hardware platform") that has been identified as capable of providing acceptable operating performance. The target platform is identified as being capable of providing acceptable operating performance for the consumer. An exemplary method for identifying over-constrained virtual machines provides a classification algorithm, such as a decision tree classifier, that "learns" how to identify over-constrained virtual machines using inputs, such as data acquired while virtual machines perform known tasks, such as workloads, under known conditions. The decision tree classifier may then be utilized by the system to determine over-constrained conditions for virtual machines. The identification of over-constrained virtual machines is useful for service providers of platform or infrastructure cloud computing services who have no information relating to operations and/or processes being run on each consumer's virtual machine.

The service providers generally take action after identifying an over-constrained virtual machine on a hardware platform. The service providers may migrate or move the over-constrained virtual machine to a target hardware platform with resources to allow the virtual machine to operate acceptably (i.e., not in an over-constrained condition). Load balancing of virtual machines during the migration process helps to ensure that the target hardware platform is the correct platform to provide acceptable operation while also enabling efficient resource utilization for the provider. An exemplary method for load balancing of virtual machines includes publish information relating to the specifications for and utilization of resources for each hardware platform on a network. The information is published to enable a peer-to-peer monitoring and evaluation of the hardware platforms by a platform hosting the migrating virtual machine, such as the over-constrained virtual machine. The target hardware platform may be selected based on assigned resources, current resource consumption data and historical resource consumption data for the over-constrained virtual machine. This information is processed along with the specification and utilization information for the networked hardware platforms. Thus, the process for selecting the target hardware platform improves load balancing to improve virtual machine operation for the consumer while improving resource utilization efficiency.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed (e.g., any client-server model).

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
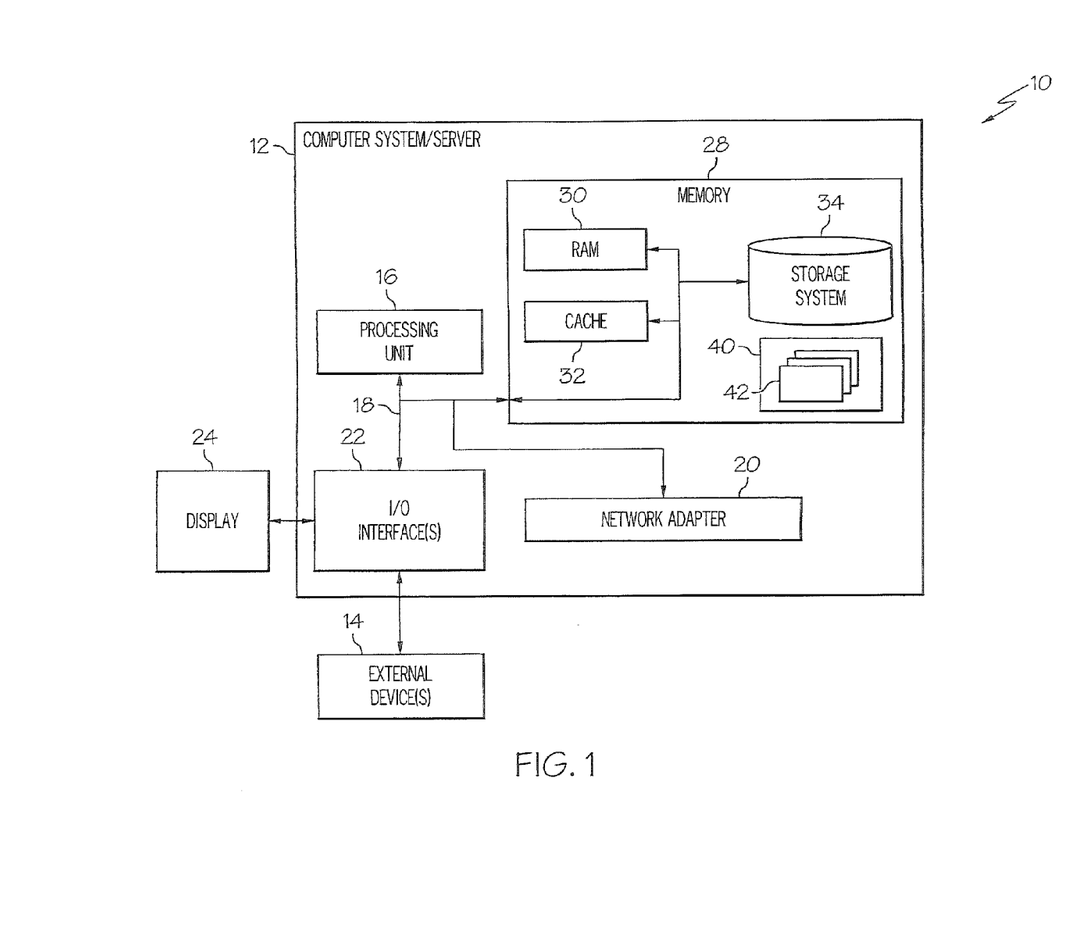
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
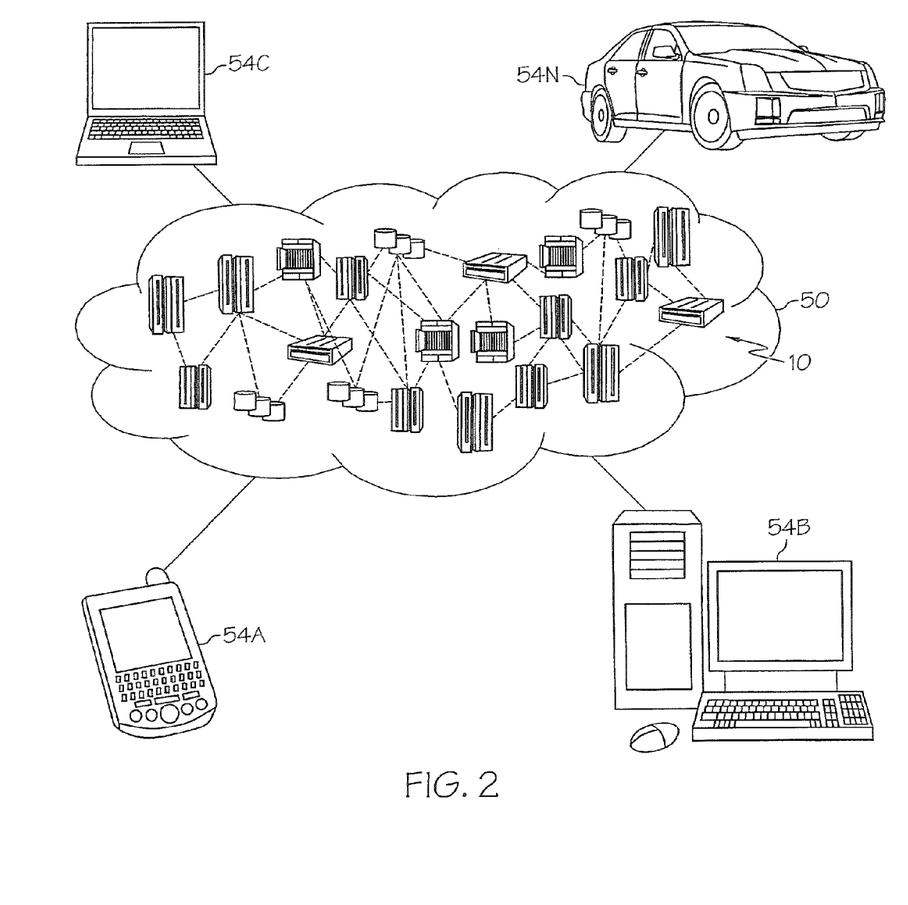
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another.

They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
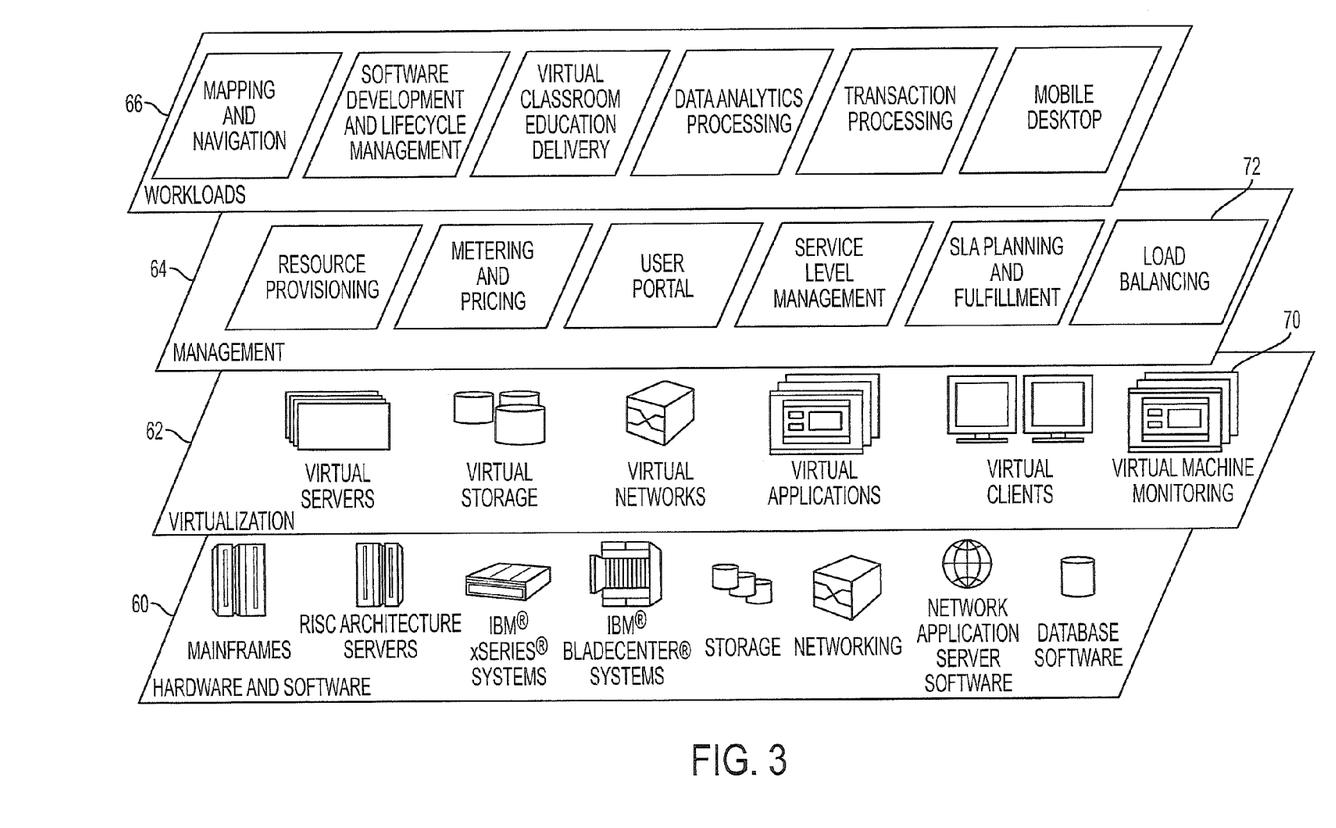
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one embodiment, one or both of the hardware and software layer 60 and the virtualization layer 62 may include edge components, such as a web server front end and image cache, as well as an image library store, e.g., in a high-performance RAID storage area network (SAN). In an exemplary embodiment, a virtual machine monitoring application 70 in the virtualization layer 62 implements the process or method for determining or identifying over-constrained virtual machines described herein; however, it will be understood that the application 70 may be implemented in any layer.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security (not shown) provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. In one exemplary embodiment, a load balancing application 72 in the management layer 64 implements the load balancing processes described herein; however, it will be understood that the application 72 may be implemented in any layer.

The load balancing application 72 includes one or more algorithms or functions to implement embodiments described herein to select the appropriate hardware platform to receive a migrating virtual machine. Exemplary migrating virtual machines may include over-constrained virtual machines as determined by the virtual machine monitoring application 70. In an embodiment, the load balancing application 72 along with other portions of management layer 64 and/or virtualization layer 62 are coupled to and/or reside in the memory 28 shown in FIG. 1. In addition, embodiments of the load balancing application 72 include one or more program modules 42 of the program/utility 40 shown in FIG. 1. In a further embodiment, the load balancing application 72 is part of the management layer 64 and is executed on hardware located in the hardware and software layer 60.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a mobile desktop for mobile devices (e.g., 54A, 54C, and 54N, as well as mobile nodes 10 in cloud computing environment 50) accessing the cloud computing services.

The virtual machine monitoring application 70 (also referred to as "virtual machine management application") includes one or more algorithms to implement embodiments described herein determine or identify over-constrained conditions for virtual machines. In an embodiment, the virtual machine monitoring application 70 along with other portions of virtualization layer 62 are coupled to and/or resides in the memory 28 shown in FIG. 1. In addition, embodiments of the virtual machine monitoring application 70 include one or more program modules 42 of the program/utility 40 shown in FIG. 1. In a further embodiment, the virtual machine monitoring application 70 is part of the management layer 64 and is executed on hardware located in the hardware and software layer 60.

In exemplary embodiments, a hardware platform or host system (located in layers 60, 62 and/or 64) includes a hypervisor configured to host one or more virtual machines. The term "hypervisor" refers to a low-level application that supports the execution of one or more virtual machines. The hypervisor manages access to resources of the hardware platform and serves as a virtual machine monitor to support concurrent execution of the virtual machines. Each virtual machine can support specific guest operating systems and multiple user sessions for executing software written to target the guest operating systems. For example, one virtual machine may support an instance of the Linux® operating system, while a second virtual machine executes an instance of the z/OS® operating system. Any suitable guest operating system can also be supported by the hypervisor through the virtual machine. In an embodiment, a hypervisor, such as a Linux KVM hypervisor, enables monitoring of each virtual machine on the platform as a process, wherein data related to performance of each process (i.e., virtual machine) may be monitored. The exemplary system utilizing a KVM hypervisor is discussed in detail in FIGS. 4-7 below. It should be noted, however, that the KVM hypervisor is one example and that any suitable software configuration, including hypervisors and operating systems, and associated hardware may be utilized to implement the processes and systems described below. A hardware platform may be described as the hardware used to support the selected operating system (i.e., hypervisor) hosting the virtual machines. Exemplary hardware platforms include elements illustrated in FIGS. 1-3.

The virtual machine monitoring application 70 and corresponding method for identifying over-constrained virtual machines may be implemented by a system with one or more computing devices (e.g., computing nodes 10 or cloud computing environment 50) configured to monitor virtual machines established on a hardware platform (e.g., computing nodes 10). The method enables the service provider to identify and migrate the over-constrained virtual machine to second hardware platform. The load balancing application 72 identifies the second hardware platform, also called the target platform, based on several factors to ensure acceptable performance for the consumer while also efficiently utilizing resources. In an embodiment, the second hardware platform provides a projected necessary amount of resources to the previously over-constrained virtual machine, thereby providing acceptable performance of the virtual machine for the consumer.

Figure 4:
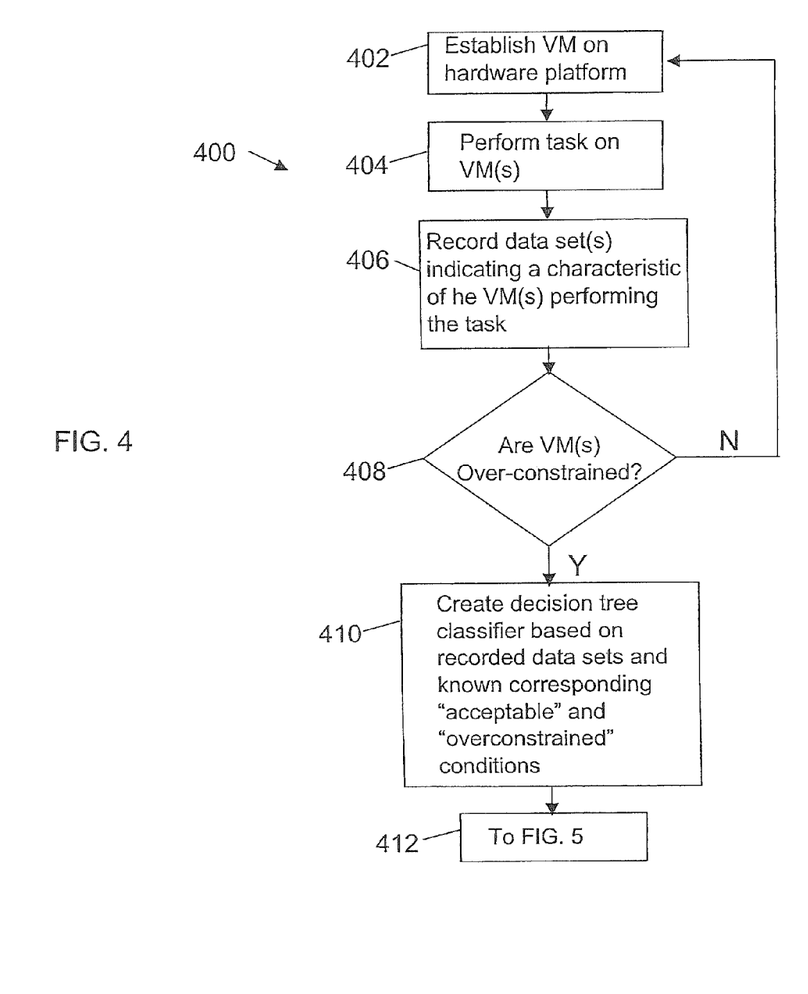
FIG. 4 depicts a block diagram of a portion of a process for identifying over-constrained virtual machines according to an embodiment of the present invention.

Turning now to FIG. 4, an exemplary process 400 for a system, such as a hypervisor running on a hardware platform, to identify over-constrained virtual machines is shown. In blocks 402, 404, 406 and 408 test virtual machines (VMs) are established on a test hardware platform and are used to produce data used for virtual machine monitoring in subsequent blocks. The data produced in blocks 402, 404, 406 and 408 may be considered benchmark data for future use. In block 402, a virtual machine is established on a hardware platform, wherein operating conditions for the hardware platform are controlled and known. In block 404, a task or workload is performed on the virtual machine. The task may be a basic task, moderately complex task or a complex task, depending on several factors and application needs. Exemplary basic tasks include individual system calls or micro benchmarks (e.g., "libmicro" benchmarks) used to perform simple operations, such as memory allocation, accessing memory, writing to memory, sending network packets, receiving network packets and mapping memory. Exemplary moderately complex tasks include functions or interactions with a database server, or a web server such as an instance of the Apache web server. Exemplary complex tasks may include software, such as middleware, utilizing a business process logic or suitable enterprise application driven by an external client. Exemplary complex tasks may perform or simulate stock trading, or an online purchase of a book by a shopper. Complex tasks may simulate enterprise applications (e.g. Websphere) driven by external consumers. In embodiments, one or more virtual machines on the hardware platform may run the workload task (benchmark) exclusively, thereby enabling control over the conditions producing the data sets. Further, in an embodiment any combination of tasks may be run on each virtual machine.

In block 406, data is recorded that relates to or indicates characteristics of the virtual machine performing the task. In an embodiment, instrumentation may be used to measure the data sets that are recorded. Exemplary data sets may include parameters related to time elapsed to perform the selected task, CPU usage of the process (virtual machine), memory usage of the process (virtual machine), I/O (input/output) throughput of the process (virtual machine), network throughput of the process (virtual machine) and any combination thereof. In addition, communication or network-related data sets may be recorded including the following non-limiting examples transmitted byte count, transmitted packet count, transmitted error count, transmitted dropped packet count, received byte count, received packet count, received error count, received dropped packet count and any combination thereof. The system may record one or more data sets pertaining to one or more parameter, depending on system constraints, system resources, desired virtual machine performance, agreed upon service parameters and other factors. In decision block 408, the data set(s) are evaluated and processed to determine if the virtual machine is over-constrained. The determination may occur by comparing the data to known acceptable and known over-constrained values, wherein an algorithm or logic performs the comparison to determine if the virtual machine is over-constrained. Any suitable method may be used for determination of an over-constrained condition based on the data recorded. The over-constrained condition (and corresponding values) may be determined by the service provider wherein a desired value for a parameter or metric is not achieved, wherein the desired value based on user experience, consumer service contracts or industry standards. In addition, the over-constrained condition may correspond to values that are identified as unacceptable by human observation, customer feedback and/or agreed upon values or performance for the provided service. In an embodiment, the data is evaluated to determine acceptable data, over-constrained data and transitional data, wherein transitional data is data in the range between acceptable and over-constrained data. In an exemplary embodiment, the over-constrained data (i.e., data corresponding to an over-constrained condition) may also be referred to as unacceptable data, wherein the acceptable and transitional data is referred to as acceptable data.

If the data is determined to be acceptable data or transitional data (i.e., not over-constrained) then the process is directed back to block 402, wherein another virtual machine is established on the hardware platform. The selected tasks are then performed on the virtual machines and corresponding data sets are recorded, as shown in blocks 404 and 406. In embodiments, the processes of blocks 402, 404, 406 and 408 are repeated until an over-constrained condition is determined for one or more virtual machines. For example, anywhere from one to 10,000 or more virtual machines may run the selected task (or more than one task) substantially in parallel (i.e. at the same time) until an over-constrained condition is determined for at least one virtual machine. Returning to decision block 408, if the data is determined to indicate an over-constrained condition, the process advances to block 410. The over-constrained condition may occur with a single virtual machine or may occur with a plurality of virtual machines running on the hardware platform.

In an embodiment, the data is an input to the decision tree classifier of block 410 after each execution of blocks 402, 404, 406 and 408, wherein acceptable and over-constrained (or unacceptable) data is incrementally input into the classifier regardless of whether the over-constrained condition is identified. After the acceptable and unacceptable data is input into the classifier, whether continually or in a larger data log, the classifier utilizes the data and its corresponding conditions are used to improve the classifier accuracy. Accordingly, in an exemplary block 410, a decision tree classifier is created based on the data set(s) recorded in block 406. In one embodiment, the data identified as over-constrained and acceptable is used by the decision tree classifier to develop the appropriate logic or algorithm. In the embodiment, the transitional data may not be used to make the decision tree classifier. In other embodiments, the transitional data, acceptable data and over-constrained data are all used to create the decision tree classifier. The data set(s) may indicate or describe one or more characteristics of the virtual machine(s) performing one or more selected tasks (i.e., workloads), as described above for block 406. Accordingly, the data is used to "train" the decision tree classifier to determine acceptable and over-constrained inputs. The accuracy of the decision tree classifier may be checked and refined based on the known classification (acceptable and over-constrained classifications) of the inputs. The decision tree classifier is a predictive model which maps observations about an input item, such as data, to conclusions about the item's value in one or more aspects. The exemplary decision tree classifier receives the item of information or data related to a process and determines or concludes if the process (i.e., virtual machine) is operating acceptably or in an over-constrained condition.

The decision tree classifier is trained to be used for identifying over-constrained virtual machines, outside of the controlled test environment of blocks 402, 404 and 406. In an embodiment, the decision tree classifier is trained to receive a variety of data sets corresponding to recorded parameters that relate to characteristics of a virtual machine performing a selected task. In another embodiment, a plurality of specific decision tree classifiers may each be trained to identify over-constrained virtual machines by receiving certain data sets of a selected parameter. Accordingly, for a system and/or hardware platform a plurality of decision tree classifiers may be "trained" by selected data sets used to develop decision tree classifiers that are configured to receive corresponding selected data inputs to identify over-constrained virtual machines. In embodiments, the data sets that the decision tree classifier(s) are based on include acceptable and over-constrained data. As shown in block 412, after the decision tree classifier has been created, a process or set of actions may utilize the decision tree classifier, such as the process shown in FIG. 5. As depicted herein, the blocks of process 400 may be performed by any suitable system including hardware and software for management of virtual machines, such as a processing system with one or more hypervisor to manage one or more virtual machines.

Figure 5:
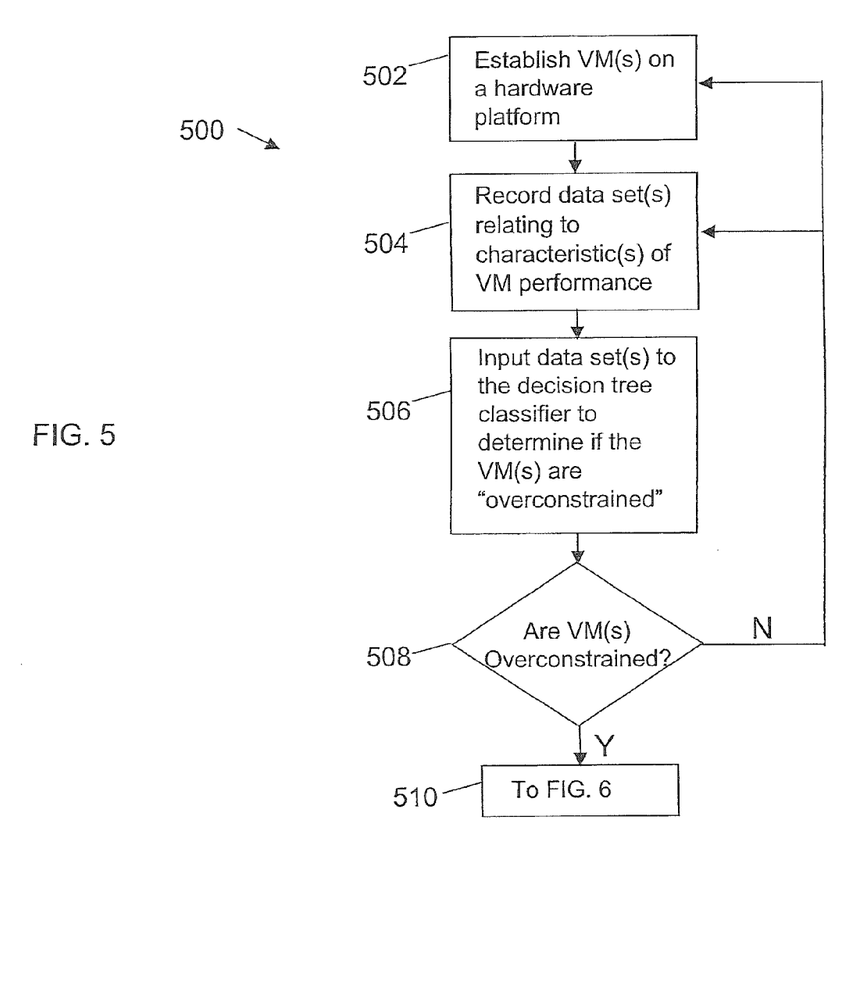
FIG. 5 depicts a block diagram of a portion of the process for identifying over-constrained virtual machines according to an embodiment of the present invention.

In FIG. 5, a process 500 is shown to monitor virtual machines on a hardware platform to identify over-constrained virtual machines. In block 502 one or more virtual machines (VMs) are established on a hardware platform. The hardware platform may be the same as or substantially identical (e.g., similar hardware and software) to the hardware platform used in process 400 to create the decision tree classifier. In another embodiment, the hardware platform of block 502 may be a different platform than process 400, such as hardware and/or software with more resources than used in process 400. As discussed above, the hardware platform includes one or more hypervisors, such as a Linux KVM hypervisor, wherein virtual machines are configured to run as and be monitored as processes. Accordingly, in block 504, data sets related to characteristics of the virtual machines are recorded. The recorded data sets may be similar to those recorded in block 406. Exemplary recorded data may include parameters relating to time to perform the selected task, CPU usage of the process (virtual machine), memory usage of the process (virtual machine), I/O (input/output) throughput of the process (virtual machine), network throughput of the process (virtual machine) and any combination thereof. In addition, communication data sets may be recorded, such as transmitted byte count, transmitted packet count, transmitted error count, transmitted dropped packet count, received byte count, received packet count, received error count, received dropped packet count and any combination thereof. In an embodiment, instrumentation may be used to measure the data sets that are recorded. The blocks of exemplary process 500 are performed on a hardware platform for IaaS or PaaS service provided to consumers, wherein the operations and processes that are run on each virtual machine are not known by the service provider. Therefore, the process uses recording of data sets describing characteristics relating to the virtual machine performance to determine an over-constrained condition for a virtual machine without information about the client's virtual machine operations.

Figure 6:
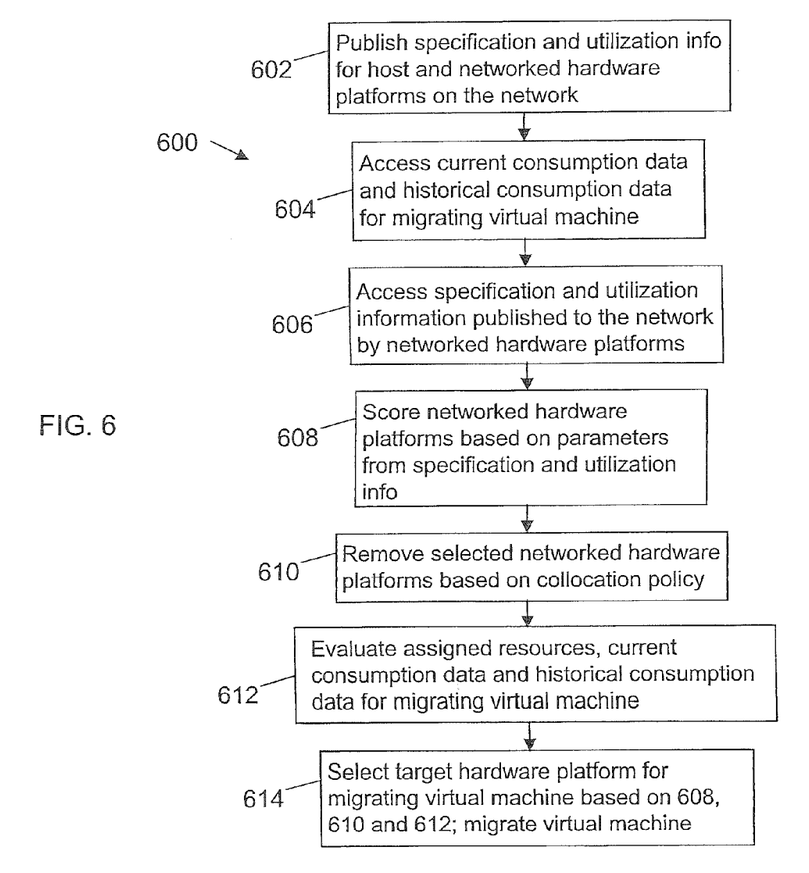
FIG. 6 depicts a flow diagram of a method for load balancing virtual machines, according to an embodiment of the present invention.

In block 506, the recorded data sets are input into the decision tree classifier that was created in block 410. In embodiments, there may be a data set for each virtual machine, wherein the decision tree classifier receives each data set to determine if each corresponding virtual machine is over-constrained. Further, a plurality of specific decision tree classifiers may be used, wherein each decision tree classifier is configured to receive specific data for one or more selected parameters. Each decision tree classifier may be trained to determine over-constrained conditions based on one or more corresponding to selected parameters. In decision block 508, if one or more virtual machines are determined to be over-constrained, the hypervisor may take an action to address the over-constrained virtual machine(s), wherein an exemplary action or process is shown in FIG. 6, as shown in block 510. In embodiments, the hypervisor may migrate the over-constrained virtual machine(s) to another hardware platform capable of providing resources to allow the virtual machine(s) to acceptably operate. If each virtual machine is determined to be acceptably operating, blocks 502, 504 and/or 506 may be continuously performed to determine if any virtual machines are over-constrained. In embodiments, the decision tree classifier may be refined over time based on several factors, such as external inputs (i.e., consumer feedback) and observed performance. For example, a consumer may indicate that his virtual machine performance was sluggish for a selected period of time. The system may retrieve the archived data sets for the selected time, indicate the corresponding data as over-constrained and input this information into the decision tree classifier to further refine the decision tree. In an exemplary embodiment, as items are added to the network, such as a newly provisioned hypervisor and associated hardware, a decision tree classifier may be imported or copied from other hypervisors on the network, wherein the new hypervisor utilizes the decision tree classifier in exemplary process 500 to monitor virtual machines.

The exemplary processes 400 and 500 may be used by a cloud computing service provider to determine if virtual machines on hardware platforms are over-constrained. The processes 400 and 500 are useful for providers of platforms and/or infrastructure services, wherein the provider has no knowledge of the operations being performed by the consumer on their respective virtual machines. The methods and systems described herein enable the service provider to efficiently allocate resources to consumers dynamically without affecting the performance of the virtual machines provided to consumers. Accordingly, the methods and systems improve the consumer experience while enabling service providers to efficiently utilize and allocate resources.

Turning to FIG. 6, an exemplary process for load balancing of virtual machines 600 is provided, wherein steps for determining a target platform for a migrating virtual machine, such as the over-constrained virtual machine, are shown. In an embodiment, the process 600 is a continuation of processes 400 and 500. In another embodiment, the process 600 is utilized by hypervisors in a cloud computing system to distribute virtual machine(s) as they are newly added to the system. In yet another embodiment, the process 600 may be used to automatically integrate hardware platforms as they are added to the cloud computing system. The automatic integration process for hardware platforms improves efficiency by reducing or eliminating operator input while also improving load balancing to enable migration of virtual machines to the added hardware platforms.

The exemplary process 600 may run on all hardware platforms of a cloud computing network, wherein a hardware platform acts as the host hardware platform when it is selecting a target platform for a hosted migrating virtual machine. Thus, a networked hardware platform acts as the depicted host hardware platform when it determines a virtual machine, such as an over-constrained virtual machine, needs to migrate. In embodiments, the processes 400 and 500 may determine that a plurality of virtual machines are over-constrained, wherein each virtual machine is on a separate hardware platform. In the example, each hardware platform hosting an over-constrained virtual machine may act as a host hardware platform that utilizes the process 600 to select a target platform. Thus, the processes 600 may be run in sequence or parallel to select the target platform, depending on application-specific criteria.

In block 602, a host hardware platform and networked hardware platforms publish (or broadcast) specification and utilization information to the cloud computing network. The host hardware platform and networked hardware platforms reside on the same network and may each include different or substantially the same resources, depending on application-specific criteria. In an embodiment, the host hardware platform is a platform from the group of networked hardware platforms that hosts or runs the migrating virtual machine (e.g., the over-constrained virtual machine). Exemplary specification information for each networked and host hardware platform includes static parameters relating to operating specifications for each platform. The information may be related to the operational and performance specifications of the resources in the hardware platform. Exemplary specification information includes memory available (i.e., a maximum of 4 GB), processor count (i.e., 4 physical CPUs with 16 logical cores), disk storage size (i.e., 1 TB), networking read and write throughput per second supported by hardware (i.e., maximum throughput of 10 GB/sec).

The utilization information includes parameters relating to usage and performance of the hardware platform's resources. This information can include current resource utilization data, logged historical data and statistical measurements of the utilization data over time. The parameters may include data measured by system administration commands, such as Load, I/O Stat or Free commands. Utilization information may include parameters indicating a percentage or amount of the specification information resources being used, currently and over time. Exemplary utilization information parameters include 50% of disk capacity is being used and/or 75% of memory is being used.

In block 604, current consumption data and historical consumption data are accessed for the migrating virtual machine running on the host hardware platform. Current consumption data may include current resource consumption of the virtual machine instantaneously or over a recent time period. The recent time period may be as short as the most recent 5 or 10 seconds or as long as the most recent week or month, wherein the data is logged over the time period. In other embodiments, the current consumption data may be the single most recent recorded data point. The resource consumption data includes data related to usage of the resources by the process or virtual machine. Exemplary resource consumption data includes processor consumption per process (for instances running on a KVM hypervisor, where a virtual machine is encapsulated as a single process), input/output read counts per second, input/output writes count per second, input/output throughput per second, network reads per second, network writes per second, network inbound throughput, network outbound throughput, page faults rate and memory consumption of a process. The historical resource consumption data includes statistical measurements of logs of the above specified resource consumption data, such as historical mean, median, maximum, minimum and standard deviation. These measurements and data are used to project the resources the migrating virtual machine will use to operate acceptably on the target platform and are used by the system to locate the appropriate target platform.

In block 606, the host hardware platform accesses specification and utilization information for the networked hardware platforms. Parameters included in the accessed specification and utilization information for each networked hardware platform are then used to score the platforms, as shown in block 608. In an embodiment, each networked hardware platform has a plurality of scores, wherein each score is based on at least one parameter. The scores may be referred to as resource availability scores to indicate the amount of resources available on the platform. In another embodiment, each networked platform has a single overall score based on the parameters. In an embodiment, the scores, for either the platform or each parameter, are rankings relative to the other networked platforms or may be an absolute score relative to a scale. The score(s) are used to indicate resource availability for each hardware platform, to assist in selection of the appropriate target platform.

In block 610, a colocation policy is utilized to remove or filter out selected networked hardware platforms from the group of candidate networked hardware platforms to receive the migrating virtual machine. The selected hardware platforms are prohibited due to properties, such as location, of the platform itself or due to hosting of prohibited virtual machine(s) on the selected hardware platform. Accordingly, the resulting group of networked hardware platforms considered for receiving the migrating virtual machine may be referred to as candidate platforms. The colocation policy may be based on several factors to limit placement of the migrating virtual machine, such factors may include consumer rules, provider rules, industry rules or any combination thereof. Colocation refers to the placement or relationship of two or more virtual machines on the same physical hardware platform, in the same physical site or in some other undesirable relationship with one another. Exemplary consumer rules include rules limiting colocation of virtual machines for competing firms, wherein the competing firms are both consumers of a single service provider. The consumers may disclose competitors to the service provider when initiating a service contract, thereby causing the provider to establish the rule. Another exemplary consumer rule may be based on the type of service and/or virtual machines desired by the consumer. Exemplary service may include high availability for two or more virtual machines, wherein the consumer specifies that at least one virtual machine should be available at all times. This service is requested by consumers that cannot have all of their virtual machines experience downtime at one time, for any reason, such as power outages, hardware failure or failure in the hypervisor stack. For example, a bank may require high availability virtual machines to support banking kiosks or automated teller machines, thereby ensuring availability of the kiosks and machines. Accordingly, the exemplary consumer rule for high availability service specifies that the virtual machines are placed on different hardware platforms to ensure that if one platform is down, a backup virtual machine is available.

Provider rules may be implemented by the service provider based on service provider preferences. Exemplary rules may include the provider assigning a high availability rule for a selected consumer, wherein the selected consumer has previously experienced service interruptions. Thus, the service provider establishes a high availability rule for the consumer to prevent future service interruptions. Additional provider rules may be based on legal requirements, such as limitations on placement of certain types of data or applications, and corresponding virtual machines, in selected physical locations for the hardware platforms. Exemplary legal requirements may prevent certain privacy-related information for citizens of a first country to be located on a hardware platform in another country, thereby causing a provider rule for the colocation policy. Further, legal or governmental requirements may prevent certain classified information from being located on a selected hardware platform in a physical location in another country. In another embodiment, provider rules and/or legal requirements may dictate that selected virtual machines be located in hardware platforms in high security locations. Industry rules for colocation of virtual machines may be related to accepted practices for placement of virtual machines based on consumer utilization, hardware platform performance or other application criteria. In an exemplary implementation of block 610, each virtual machine and hardware platform in a cloud computing system may be assigned and referred to by a standardized unique identifier, such as a UUID (universally unique identifier). Accordingly, the rules of the colocation policy utilize the unique identifiers of the virtual machines and hardware platforms that are eligible or ineligible for colocation with and placement of the virtual machine, respectively. The colocation criteria may be established when the virtual machine is created and may be modified over time. In another embodiment, the policy may be during run time based on feedback or other factors affecting virtual machine performance.

In block 612, assigned resources, current consumption data and historical consumption data are evaluated for the migrating virtual machine. This information is evaluated to project the type and amount of resources that the migrating virtual machine will use on a target platform while operating in a condition that is not over-constrained. The assigned resources are the resources that are agreed upon to be provided by the service provider to the consumer. For example, when a service contract is initiated a provider may agree to provide certain amounts of memory, bandwidth and processing power to a consumer. Current consumption data may include current resource consumption of the virtual machine instantaneously or over a recent time period. The historical resource consumption data includes statistical measurements of logs of the resource consumption data, such as historical mean, median, maximum, minimum and standard deviation. These measurements and data are used to project the resources the migrating virtual machine will use to operate acceptably on the target platform and are used by the system to locate the appropriate target platform.

In block 614, the target platform for the migrating virtual machine (i.e., over-constrained virtual machine) is selected based on blocks 608, 610 and 612. In an embodiment, a determination of the best fit for the target platform and migrating virtual machine is based at least in part on one or more functions performing a comparison of the assigned resources, current consumption data and historical consumption data to the utilization information for the candidate platforms. In embodiments, the system includes a fitness function to process each parameter from the current and historical resource consumption data for the migrating virtual machine. In another embodiment, a single fitness function may be used to process all parameters for the current and historical consumption data. The fitness functions process the information for the migrating virtual machine to analyze and score the networked hardware platforms, which are then used to select the target platform. The colocation policy is then applied to filter out platforms to produce a group of candidate platforms. The candidate platforms are then scored and sorted by the fitness functions based on the previously processed parameters for the current and historical consumption data along with the specification and utilization information for each of the candidate platforms. A migration candidacy score is then established for each of the sorted candidate platforms. In other embodiments, the migration candidacy score may be computed by using multiple sorted lists of the candidate platforms by the fitness parameters evaluation, a single list with multiple indices for the parameters or using an alternative non-list structure for scoring and sorting the parameter data.

In an embodiment, the target platform is determined by the fitness function as fit for receiving the migrating virtual machine when the available resources of the target platform are substantially the same or slightly greater than the resources projected for acceptable operation of the migrating virtual machine. Thus, the migrating virtual machine will acceptably operate on the target platform. The resources projected for acceptable operation of the migrating virtual machine are determined by the evaluation and analysis of the assigned resources, current resource consumption data and historical resource consumption data. Accordingly, the target platform is selected based on the scoring, sorting, colocation policy implementation, fitness processing and evaluation from blocks 608, 610 and 612. After selection of the target platform, the migrating virtual machine is migrated to and hosted by the target platform.

The exemplary process 600 may be used to automatically integrate hardware platforms as they are added to the cloud computing system, thereby improving efficiency by reducing or eliminating operator input while also improving load balancing to enable migration of virtual machines to the added hardware platform. In an example, when new hardware, such as all or a part of a hardware platform, is added it is plugged into a power outlet and networked (via ethernet cable, fiber optic, wireless, etc.). The hardware then boots up the hypervisor, which can be done automatically by booting with network boot technologies such as PXE, or by inserting a "live CD" or "liveDVD" or "bootable USB" device which contains the hypervisor operating system and additional software. The booted hypervisor is configured to automatically start software running the process 600, which in turn publishes the hardware platform specification and utilization information, and broadcasts that it is hosting zero virtual machines, since none have been provisioned locally, and none have been migrated to the hardware. The other hypervisor instances (residing on networked hardware platforms) on the network receive notice of this new hardware via the published information and can then migrate virtual machines to the newly added hardware platform as if it was any other peer on the network. This concept allows rapid scale out (i.e., addition of more hardware to support more work or machines) with minimal operator involvement other than physically placing the hardware in the data center and providing power. Adding new hardware using the peer-to-peer publishing of information of process 600 ads capacity to the network almost instantaneously, which reduces the operator cost and drives down the cost of cloud computing for providers.

Figure 7:
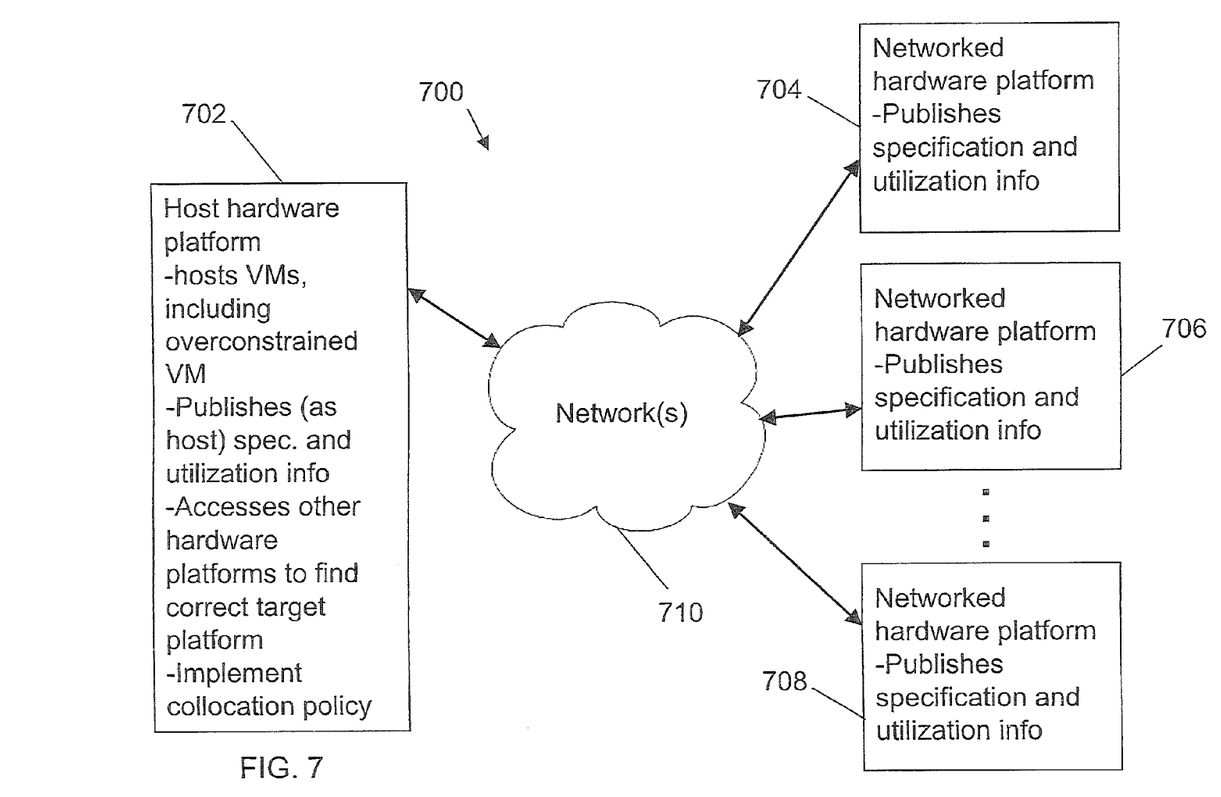
FIG. 7 depicts a diagram of a portion of a cloud computing system including a host hardware platform, according to an embodiment of the present invention.

FIG. 7 is a diagram of a portion of an exemplary cloud computing system 700 including a host hardware platform 702. The host hardware platform 702 hosts a selected number of virtual machines, wherein one of the virtual machines is over-constrained and is to be migrated using the process 600 described in FIG. 6. The host hardware platform 702 communicates, peer-to-peer, with other networked hardware platforms 704, 706 and 708 via network 710. Accordingly, the host hardware platform 702 publishes specification and utilization information while accessing the specification and utilization information published by networked virtual machines 704, 706 and 708. Accordingly, the system selects the target platform based on resource consumption information from the over-constrained virtual machine along with colocation policy implementation, fitness processing, evaluation and scoring, sorting, of the networked hardware platforms 704, 706 and 708. Once the target platform is selected, the over-constrained virtual machine is migrated to the target platform that is the most fit to host the virtual machine, thereby improving load balancing while efficiently utilizing system resources.

Technical effects and benefits include a method and system for load balancing virtual machines across hardware platforms of a networked system. The method enables service providers to efficiently allocate system resources while delivering acceptable operation of virtual machines for consumers or end users.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for virtual machine management, comprising:
    establishing a first virtual machine on a hardware platform;
    performing a selected task on the first virtual machine;
    recording a first data set indicating a characteristic of the first virtual machine performing the selected task;
    establishing a second virtual machine on the hardware platform;
    performing the selected task on the first and second virtual machines;
    recording a second data set indicating the characteristic of the first and second virtual machines performing the selected task;
    indicating acceptable data and unacceptable data within the first and second data sets, the indicating comprising determining unacceptable data based on an over-constrained condition for the first or second virtual machine;
    creating and training a decision tree based on a first subset of data that is indicated as acceptable and a second subset of data that is indicated as unacceptable from the first and second data sets; and
    inputting a third data set from a third virtual machine into the decision tree wherein the decision tree is used to predict whether the third virtual machine will be over-constrained based at least in part on the acceptable data and the unacceptable data from the first and second subsets, and wherein the third data set is current data and historical data of the third virtual machine.

2. The method of claim 1, wherein the selected task comprises a selected task run exclusively on each of the first and second virtual machines.

3. The method of claim 2, wherein the selected task comprises one selected from the group consisting of: sending network packets, receiving network packets, accessing memory, web serving, database serving and an enterprise application driven by external inputs. memory allocation, accessing memory, writing to memory, sending network packets, receiving network packets, mapping memory, database interactions, enterprise applications driven by external consumers and any combination thereof.

4. The method of claim 1, wherein the characteristic comprises a parameter relating to one selected from the group consisting of processor usage, memory usage, input/output throughput, network throughput and any combination thereof.

5. The method of claim 1, wherein the third virtual machine runs as a process on a hypervisor on a second hardware platform substantially the same as the hardware platform and wherein operations on the third virtual machine are not known by the hypervisor.

6. The method of claim 1, wherein the characteristic comprises a parameter relating to one selected from the group consisting of time to perform the selected task, transmitted byte count, transmitted packet count, transmitted error count, transmitted dropped packet count, received byte count, received packet count, received error count, received dropped packet count and any combination thereof.

7. The method of claim 1, comprising archiving the third data set, indicating acceptable data and unacceptable data in the third data set based on an external input, and refining the decision tree based on the acceptable and unacceptable data from the archived third data set.

8. The method of claim 1, wherein the unacceptable data corresponds to an over-constrained condition of the first virtual machine or the second virtual machine.

9. The method of claim 1, wherein creating the decision tree comprises inputting the acceptable and unacceptable data to the decision tree to produce corresponding acceptable and over-constrained classifications, respectively.

10. A system, comprising:
    a computer processor; and
    logic executable by the computer processor, the logic configured to implement a method, the method including:
        establishing a first virtual machine on a hardware platform;
        performing a selected task on the first virtual machine;
        recording a first data set indicating a characteristic of the first virtual machine performing the selected task;
        establishing a second virtual machine on the hardware platform;
        performing the selected task on the first and second virtual machines;

recording a second data set indicating the characteristic of the first and second virtual machines performing the selected task;

indicating acceptable data and unacceptable data within the first and second data sets, the indicating comprising determining unacceptable data based on an over-constrained condition for the first or second virtual machine;

creating and training a decision tree based on a first subset of data that is indicated as acceptable and a second subset of data that is indicated as unacceptable from the first and second data sets; and inputting a third data set from a third virtual machine into the decision tree wherein the decision tree is used to predict whether the third virtual machine will be over-constrained based at least in part on the acceptable data and the unacceptable data from the first and second subsets, and wherein the third data set is current data and historical data of the third virtual machine.

11. The system of claim 10, wherein the selected task comprises a selected task run exclusively on each of the first and second virtual machines.

12. The system of claim 11, wherein the selected task comprises one selected from the group consisting of: sending network packets, receiving network packets, accessing memory, web serving, database serving and an enterprise application driven by external inputs. memory allocation, accessing memory, writing to memory, sending network packets, receiving network packets, mapping memory, database interactions, enterprise applications driven by external consumers and any combination thereof.

13. The system of claim 10, wherein the characteristic comprises a parameter relating to one selected from the group consisting of time to perform the selected task, processor usage, memory usage, input/output throughput, network throughput, transmitted byte count, transmitted packet count, transmitted error count, transmitted dropped packet count, received byte count, received packet count, received error count, received dropped packet count and any combination thereof.

14. The system of claim 10, wherein the third virtual machine runs as a process on a hypervisor and wherein operations on the third virtual machine are not known by the hypervisor.

15. The system of claim 10, comprising archiving the third data set, indicating acceptable data and unacceptable data in the third data set based on an external input, and refining the decision tree based on the acceptable and unacceptable data from the archived third data set.

16. The system of claim 10, wherein the unacceptable data corresponds to an over-constrained condition of the first virtual machine or the second virtual machine.

17. The system of claim 10, wherein creating the decision tree comprises inputting the acceptable and unacceptable data to the decision tree to produce corresponding acceptable and over-constrained classifications, respectively.

18. A computer program product comprising a non-transitory storage medium having computer-readable program code embodied thereon, which when executed by a computer processor, causes the computer processor to implement a method, the method comprising:

establishing a first virtual machine on a hardware platform;

performing a selected task on the first virtual machine;

recording a first data set indicating a characteristic of the first virtual machine performing the selected task;

establishing a second virtual machine on the hardware platform;

performing the selected task on the first and second virtual machines;

recording a second data set indicating the characteristic of the first and second virtual machines performing the selected task;

indicating acceptable data and unacceptable data within the first and second data sets, the indicating comprising determining unacceptable data based on an over-constrained condition for the first or second virtual machine;

creating and training a decision tree based on a first subset of data that is indicated as acceptable and a second subset of data that is indicated as unacceptable from the first and second data sets; and inputting a third data set from a third virtual machine into the decision tree wherein the decision tree is used to predict whether the third virtual machine will be over-constrained based at least in part on the acceptable data and the unacceptable data from the first and second subsets, and wherein the third data set is current data and historical data of the third virtual machine.

19. The computer program product of claim 18, wherein the selected task comprises a selected task run exclusively on each of the first and second virtual machines.

20. The computer program product of claim 19, wherein the selected task comprises one selected from the group consisting of: sending network packets, receiving network packets, accessing memory, web serving, database serving and an enterprise application driven by external inputs. memory allocation, accessing memory, writing to memory, sending network packets, receiving network packets, mapping memory, database interactions, enterprise applications driven by external consumers and any combination thereof.

21. The computer program product of claim 18, wherein the characteristic comprises a parameter relating to one selected from the group consisting of time to perform the selected task, processor usage, memory usage, input/output throughput, network throughput, transmitted byte count, transmitted packet count, transmitted error count, transmitted dropped packet count, received byte count, received packet count, received error count, received dropped packet count and any combination thereof.

22. The computer program product of claim 18, wherein the third virtual machine runs as a process on a hypervisor and wherein operations on the third virtual machine are not known by the hypervisor.

23. The computer program product of claim 18, comprising archiving the third data set, indicating acceptable data and unacceptable data in the third data set based on an external input, and refining the decision tree based on the acceptable and unacceptable data from the archived third data set.

24. The computer program product of claim 18, wherein the unacceptable data corresponds to an over-constrained condition of the first virtual machine or the second virtual machine.

25. The computer program product of claim 18, wherein creating the decision tree comprises inputting the acceptable and unacceptable data to the decision tree to produce corresponding acceptable and over-constrained classifications, respectively.

* * * * *